(12) United States Patent
Akasaka et al.

(10) Patent No.: US 10,498,102 B2
(45) Date of Patent: Dec. 3, 2019

(54) OPTICAL PHASE-SENSITIVE AMPLIFIER WITH SIGNAL NOISE REMOVAL

(71) Applicant: Fujitsu Limited, Kawasaki-shi, Kanagawa (JP)

(72) Inventors: Youichi Akasaka, Plano, TX (US); Tadashi Ikeuchi, Plano, TX (US); Daniel Bihon, Allen, TX (US); Richard Colter, Dallas, TX (US)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 15/628,245

(22) Filed: Jun. 20, 2017

(65) Prior Publication Data
US 2018/0366900 A1 Dec. 20, 2018

(51) Int. Cl.
| | |
|---|---|
| *H01S 3/10* | (2006.01) |
| *H01S 3/067* | (2006.01) |
| *H04B 10/291* | (2013.01) |
| *H01S 3/131* | (2006.01) |
| *H04J 14/02* | (2006.01) |
| *H01S 3/30* | (2006.01) |
| *H01S 3/00* | (2006.01) |
| *G02F 1/31* | (2006.01) |

(52) U.S. Cl.
CPC ........... *H01S 3/10007* (2013.01); *G02F 1/31* (2013.01); *H01S 3/06754* (2013.01); *H01S 3/06758* (2013.01); *H01S 3/1312* (2013.01); *H04B 10/291* (2013.01); *H04B 10/2914* (2013.01); *H04B 10/2916* (2013.01); *H04J 14/02* (2013.01); *H01S 3/0064* (2013.01); *H01S 3/0092* (2013.01); *H01S 3/302* (2013.01); *H01S 2301/02* (2013.01); *H01S 2301/03* (2013.01)

(58) Field of Classification Search
CPC ............ H01S 3/10007; H01S 3/06754; H01S 3/06758; H01S 3/1312; H01S 3/0092; H04B 10/291; H04B 10/2914; H04B 10/2916
See application file for complete search history.

(56) References Cited

U.S. PATENT DOCUMENTS

| | | | |
|---|---|---|---|
| 9,997,887 B1 * | 6/2018 | Akasaka | ............ H04B 10/2519 |
| 2014/0043674 A1 | 2/2014 | Takasaka et al. | |
| 2016/0172818 A1 | 6/2016 | Takasaka | |
| 2017/0141871 A1 * | 5/2017 | Yang | .................... H04B 10/564 |
| 2018/0212701 A1 * | 7/2018 | Akasaka | ............ H04J 14/0212 |

OTHER PUBLICATIONS

Notice of Allowance for U.S. Appl. No. 15/426,811, dated Feb. 12, 2018; 14 pages.

(Continued)

*Primary Examiner* — Eric L Bolda
(74) *Attorney, Agent, or Firm* — Baker Botts L.L.P.

(57) ABSTRACT

Phase modulation of an output optical signal from a phase-sensitive amplifier may be used to perform phase adjustment for optimal phase-sensitive amplification. Specifically, when the optical pump is phase modulated to suppress SBS, a second phase modulator may be used to counter dither the first phase modulator. Both phase modulators may be controlled by a phase shifter. Intensity modulation of the output optical signal may also be performed to reduce noise. In this manner, the OSNR of the output optical signal may be increased.

15 Claims, 5 Drawing Sheets

(56) References Cited

OTHER PUBLICATIONS

"Fiber Bragg grating." Wikipedia, Wikimedia Foundation, Dec. 18, 2017, en.wikipedia.org/wiki/Fiber_Bragg_grating; 14 pages.
"Reinforced FBG Sensors Serve Demanding Applications." Technica, Dec. 18, 2017, technicasa.com/reinforced-fbg-sensors-serve-demanding-applications/; Published Sep. 22, 2016. 10 pages.

* cited by examiner

OPTICAL PHASE-SENSITIVE AMPLIFIER WITH SIGNAL NOISE REMOVAL

BACKGROUND

Field of the Disclosure

The present disclosure relates generally to optical communication networks and, more particularly, to an optical phase-sensitive amplifier with signal noise removal.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

Optical networks may also include various optical elements, such as amplifiers, dispersion compensators, multiplexer/demultiplexer filters, wavelength selective switches (WSS), optical switches, couplers, etc. to perform various operations within the network. In particular, optical networks may include costly optical-electrical-optical (O-E-O) regeneration at colorless, directionless, contentionless reconfigurable optical add-drop multiplexers (CDC ROADMs) when the reach of an optical signal is limited in a single optical path.

As data rates for optical networks continue to increase, reaching up to 1 terabit/s (1 T) and beyond, the demands on optical signal-to-noise ratios (OSNR) also increase, for example, due to the use of advanced modulation formats, such as QAM and PSK with dual polarization. In particular, noise accumulations resulting from cascading of optical amplifiers in an optical network operating at very high data rates may limit the reach of an optical signal at a desired level of OSNR and may result in an increased number of O-E-O regenerations, which is economically disadvantageous.

SUMMARY

In one aspect, an optical system for phase-sensitive amplification of optical signals is disclosed. The optical system may include an input optical signal and a phase-sensitive amplifier (PSA) stage I receiving the input optical signal. In the optical system, the PSA stage I may include a pump laser generating a first pump wavelength, a first phase modulator for phase modulating the first pump wavelength, and a first non-linear optical element (NLE) through which the input optical signal and the first pump wavelength are transmitted to generate a PSA stage I optical signal comprising the input optical signal, the first pump wavelength, and an idler signal generated using the first NLE. The optical system may further include a PSA stage II receiving the PSA stage I optical signal. In the optical system, the PSA stage II may further include a second NLE through which the PSA stage I optical signal is amplified to generate an output optical signal, and a second phase modulator for phase modulating the output optical signal. In the optical system, the second phase modulator may counter dither the first phase modulator to reduce noise in the output optical signal.

In any of the disclosed embodiments of the optical system, the PSA stage II may further include a Raman amplifier, and a second pump wavelength for transmission through the Raman amplifier in a counter propagating direction to the PSA stage I signal.

In any of the disclosed embodiments, the optical system may further include a phase shifter to control the first phase modulator and the second phase modulator.

In any of the disclosed embodiments of the optical system, the input optical signal may include a wavelength division multiplexed (WDM) optical signal.

In any of the disclosed embodiments, the optical system may further include an intensity modulator for intensity modulating the output optical signal, such that the intensity modulator reduces intensity modulation in the output optical signal resulting from the phase modulation of the first pump wavelength.

In another aspect, a phase-sensitive amplifier is disclosed. The phase-sensitive amplifier may include a phase-sensitive amplifier (PSA) stage I receiving an input optical signal. In the phase-sensitive amplifier, the PSA stage I may further include a pump laser generating a first pump wavelength, a first phase modulator for phase modulating the first pump wavelength, and a first non-linear optical element (NLE) through which the input optical signal and the first pump wavelength are transmitted to generate a PSA stage I optical signal comprising the input optical signal, the first pump wavelength, and an idler signal generated using the first NLE. The phase-sensitive amplifier may include a PSA stage II receiving the PSA stage I optical signal. In the phase-sensitive amplifier, the PSA stage II may further include a second NLE through which the PSA stage I optical signal is amplified to generate an output optical signal, and a second phase modulator for phase modulating the output optical signal. In the phase-sensitive amplifier, the second phase modulator may counter dither the first phase modulator to reduce noise in the output optical signal.

In any of the disclosed embodiments of the phase-sensitive amplifier, the PSA stage II may further include a Raman amplifier, and a second pump wavelength for transmission through the Raman amplifier in a counter propagating direction to the PSA stage I signal.

In any of the disclosed embodiments, the phase-sensitive amplifier may further include a phase shifter to control the first phase modulator and the second phase modulator.

In any of the disclosed embodiments of the phase-sensitive amplifier, the input optical signal may include a wavelength division multiplexed (WDM) optical signal.

In any of the disclosed embodiments, the phase-sensitive amplifier may further include an intensity modulator for intensity modulating the output optical signal, wherein the intensity modulator reduces intensity modulation in the output optical signal resulting from the phase modulation of the first pump wavelength.

In yet a further aspect, a method for operating phase-sensitive amplifiers in optical networks is disclosed. The method may include receiving an input optical signal, sending the input optical signal to a phase-sensitive amplifier (PSA) stage I to generate an idler signal, and amplifying a PSA stage I optical signal using a PSA stage II. In the method, sending the input optical signal to the PSA stage I may further include phase modulating a first pump wavelength using a first phase modulator, and transmitting the input optical signal and the first pump wavelength through a first non-linear optical element (NLE) to generate a PSA stage I optical signal comprising the input optical signal, the first pump wavelength, and the idler signal generated using the first NLE. In the method, amplifying the PSA stage I optical signal using the PSA stage II may further include transmitting the PSA stage I optical signal through a second NLE to amplify the PSA stage I optical signal to generate an output optical signal, and phase modulating the output optical signal using a second phase modulator that counter dithers the first phase modulator to reduce noise in the output optical signal.

In any of the disclosed embodiments of the method, amplifying the PSA stage I optical signal may further include transmitting a second pump wavelength through a Raman amplifier in a counter propagating direction to the PSA stage I signal.

In any of the disclosed embodiments of the method, phase modulating the first pump wavelength and phase modulating the output optical signal may further include controlling the first phase modulator and the second phase modulator using a phase shifter.

In any of the disclosed embodiments of the method, the input optical signal may further include a wavelength division multiplexed (WDM) optical signal.

In any of the disclosed embodiments of the method, amplifying the PSA stage I optical signal may further include intensity modulating the output optical signal, including reducing intensity modulation in the output optical signal resulting from the phase modulating of the first pump wavelength.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
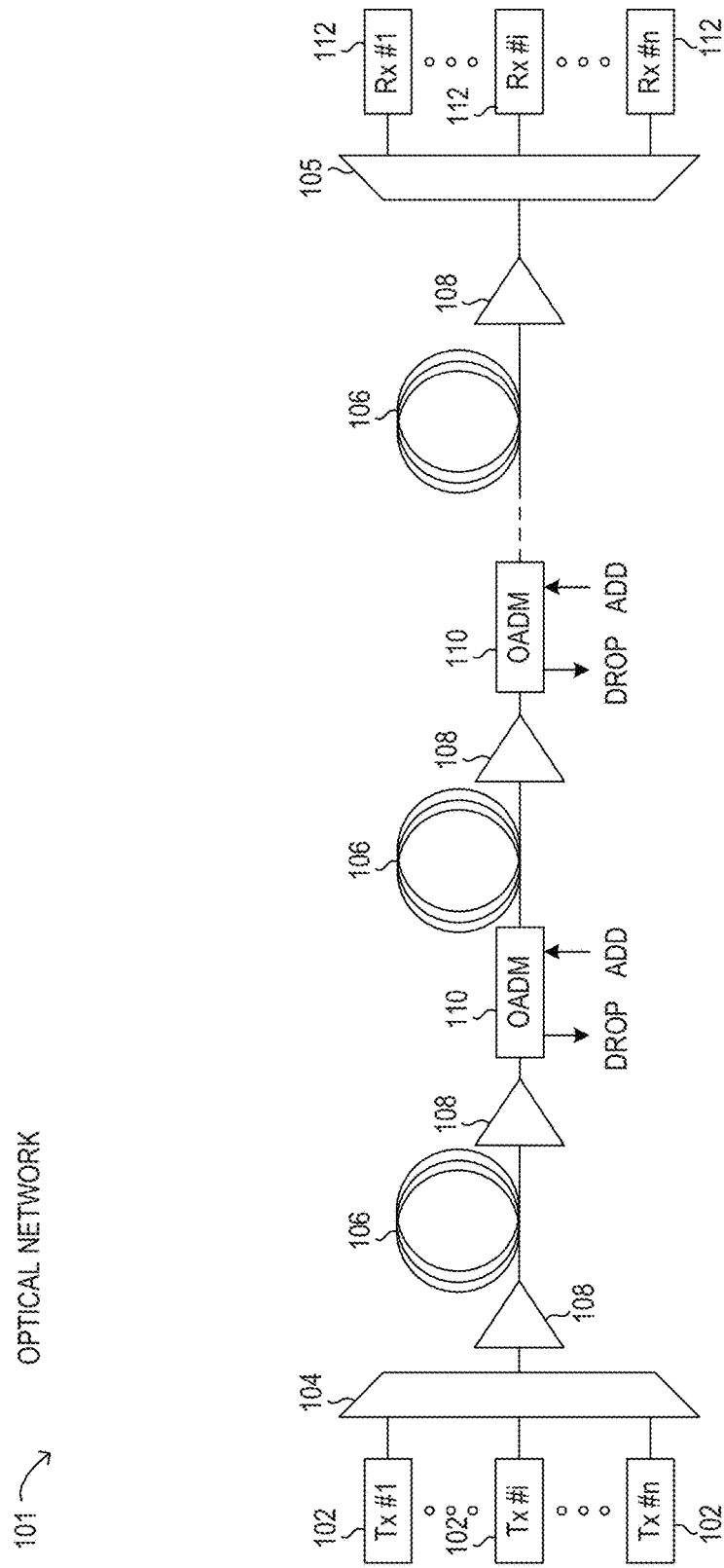
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted above, the capacity demands for optical networks continue to grow, while the available optical bandwidth may be exhausted and unable to carry additional optical signals. One way to increase capacity is the use of complex modulation techniques that code multiple symbols onto a single carrier wavelength period. Thus, higher order modulation formats, such as 16 QAM, 64 QAM, and 256 QAM are desired to increase data transmission capacity. However, such higher order modulation formats involve a higher OSNR in the optical signal to attain comparable reach distances as lower order modulation formats, such as QPSK.

One source of noise in optical signals occurs at phase-sensitive amplifiers (PSA), which are also referred to as optical parametric amplifiers (OPA). For example, one source of phase noise may be introduced into a PSA from phase modulation of an optical pump frequency at a lower frequency, in order to suppress stimulated Brillouin scattering (SBS) with an optical fiber. This additional phase modulation may be transferred to the output optical signal in a PSA and may result in degraded signal quality, otherwise known as lower OSNR, which is undesirable, particularly when higher order modulation formats are used. Known techniques to suppress such undesired phase modulation in the optical signal may be the use of a fiber having a higher threshold to SBS, such as a fiber with reduced material uniformity, as well as the use of two pump lasers with opposite phase modulation for counter dithering and reducing overall the phase modulation in the output optical signal.

As will be disclosed in further detail herein, a PSA with signal noise removal may include a second phase modulator at the output optical signal. The second phase modulator has opposite phase modulation as compared to an optical pump which is phase modulated using a first phase modulator to suppress SBS. A phase shifter may control operation of the first phase modulator and the second phase modulator. In this manner, the net phase modulation may be reduced, and may result in an improvement in OSNR of the output optical signal.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal. Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (see also FIG. 2) that may be included in a ROADM. ROADMs are considered 'colorless' when the ROADM is able to add/drop any arbitrary wavelength. ROADMs are considered 'directionless' when the ROADM is able to add/drop any wavelength regardless of the direction of propagation. ROADMs are considered 'contentionless' when the ROADM is able to switch any contended wavelength (already occupied wavelength) to any other wavelength that is available.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the OSNR for transmission over optical network 101.

In operation of optical network 101, as data rates approach 1 T and beyond, a correspondingly high OSNR becomes desirable to maintain economic feasibility by avoiding excessive numbers of O-E-O regenerators. One source of OSNR reduction is the noise accumulation resulting from cascaded optical amplifiers 108 at various points in the transmission path. For an optical amplifier, OSNR may be represented as a noise figure (NF), given by Equation 1, where $OSNR_{in}$ is the input OSNR, $OSNR_{out}$ is the output OSNR, and dB is decibels.

$$NF=10 \log(OSNR_{in}/OSNR_{out})=OSNR_{in}[dB]-OSNR_{out}[dB] \quad \text{Equation (1)}$$

Current designs for optical amplifiers may include optical phase-sensitive amplifiers (PSA), which may exhibit a low noise figure, such as less than 3 dB in many instances. Some PSA designs, such as the PSA with signal noise removal disclosed herein, may exhibit a lower noise figure than 3 dB noise figure, such as less than 2 dB noise figure, or less than 1 dB noise figure. The lower noise figure may enable an increased optical reach for a given optical signal, which is desirable.

A typical phase-sensitive optical amplifier will have different stages, including an idler stage to initially generate an idler signal using an optical pump and an amplification stage to amplify the input signal using the optical pump and the idler signal. In between the idler stage and the amplification stage, an intermediate stage may be implemented in the phase-sensitive optical amplifier. The intermediate stage may involve complex signal processing and pump power recovery to adjust the power level of the input signal and the idler signal. In typical phase-sensitive optical amplifiers, the optical paths of the input signal, the optical pump, and the idler signal may be separated in the intermediate stage in order to independently modulate power of each of the signals.

As noted previously, when the optical pump is phase modulated to suppress SBS in the fiber, the phase modulation of the optical pump may be transferred to the output optical signal, which is undesirable because of the reduction of OSNR in the output optical signal of the phase-sensitive optical amplifier.

As will be described in further detail, methods and systems are disclosed herein for implementing a phase-sensitive amplifier (PSA) with signal noise removal. The PSA with signal noise removal disclosed herein may enable phase matching of optical signals and pump signals. The PSA with signal noise removal disclosed herein may be used to provide a PSA having 0 dB noise figure, which may, in turn, enable extension of the reach of optical signals transmitted over optical networks.

Figure 2:
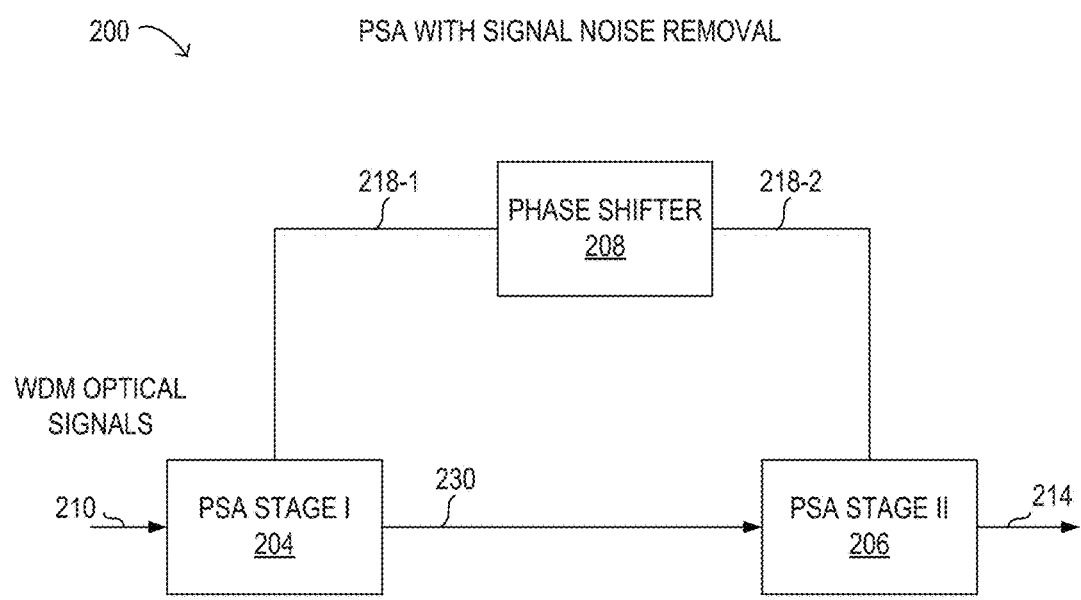
FIG. 2 is a block diagram of selected elements of an embodiment of an optical phase-sensitive amplifier with signal noise removal.

FIG. 2 is a block diagram of selected elements of an embodiment of an optical PSA 200 with signal noise removal. In PSA 200, a WDM optical signal 210 may be received by a PSA stage I 204. In PSA stage I 204, simple four wave mixing (FWM) may occur to generate so-called "idler signals", which are conjugate wavelengths of an optical signal, such as WDM optical signal 210, relative to a pump wavelength. In FWM, the idler signals appear when the optical signal and the pump wavelength are passed through a non-linear element (NLE), such as a highly non-linear fiber (HNLF). In various embodiments, other NLEs may also be used to facilitate FWM, such as optical crystals or other optical materials. In the NLE, photons are converted from the pump wavelength and the optical signal to the idler signal by non-linear processes.

Accordingly, PSA stage I 204 outputs a PSA stage I optical signal 230, in which the intensity of the pump wavelength and the optical signal is diminished, but in which the idler signals have been added. Conjugate idler signals may appear in PSA stage I optical signal 230 for each channel in the WDM optical signal 210. It is noted that PSA stage I 204 may be used with an input signal that includes a single optical channel.

Then, in PSA 200, a PSA stage II 206 may receive PSA stage II optical signal 230 and may amplify WDM optical signal 210. PSA stage II 206 may also include Raman amplification, as well as other elements described in further detail below, in order to generate output WDM output signal 214, in which the channels have been amplified relative to input WDM optical signal 210.

Also shown with PSA 200 is phase shifter 208. As will be described in further detail below, phase shifter 208 may generate a first phase control signal 218-1 and a second phase control signal 218-2. The first phase control signal 218-1 may be used to control a first phase modulator (see FIG. 3, PM 320) that phase modulates the optical pump. The second phase control signal 218-2 may be used to control a second phase modulator (see FIG. 4, PM 420) that phase modulates the output optical signal to counter dither the phase modulation from the first phase modulator, and thus, reduce OSNR in the output optical signal. Also, some intensity modulation in the output optical signal may also result from the phase modulation of the first phase modulator. Thus, the second phase modulator may include, or may be accompanied by, an intensity modulator to counter the transferred intensity modulation in the output optical signal. It is noted that phase shifter 208 may be implemented using any of a variety of phase control devices.

Figure 3:
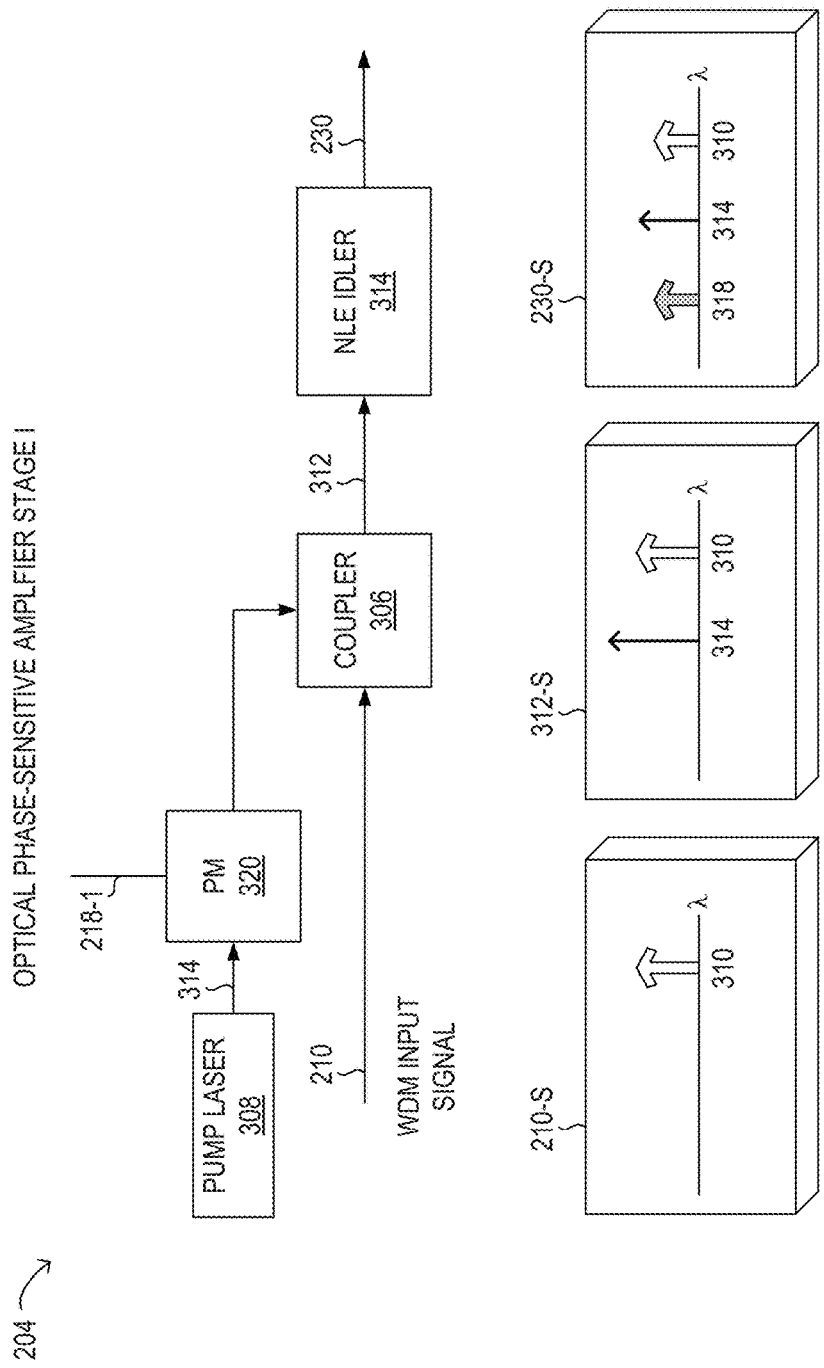
FIG. 3 is a block diagram of selected elements of an embodiment of a phase-sensitive optical amplifier stage I.

Referring now to FIG. 3, selected elements of an embodiment of an optical PSA stage I 204 are depicted. In FIG. 3, optical PSA stage I 204 is shown in a schematic representation and is not drawn to scale. It is noted that, in different embodiments, optical PSA stage I 204 may be operated with additional or fewer elements as shown in FIG. 3.

In FIG. 3, optical PSA stage I 204 receives WDM input signal 210 and adds a pump wavelength 314 from a pump laser 308 using coupler 306. Pump wavelength 314 is phase modulated using phase modulator (PM) 320, which is shown receiving first phase control signal 218-1 from phase shifter 208, as described above. Intermediate stage I signal 312, comprising WDM input signal 210 and phase-modulated pump wavelength 314 are then sent to NLE idler 314, which is a non-linear optical element. Because intermediate stage I signal 312 includes pump wavelength 314 and WDM input signal 210, simple four wave mixing (FWM) may occur at NLE idler 314 to generate idler signals 318, resulting in PSA stage I optical signal 230, as described above with respect to FIG. 2.

Also shown in FIG. 3 are spectra of the different signals transmitted in optical PSA stage I 204. In spectra 210-S, optical signal 310 represents one or more wavelengths included in WDM input signal 210. In spectra 312-S, corresponding to intermediate stage I signal 312, pump wavelength 314 is added to optical signal 310. In spectra 230-S corresponding to PSA stage I optical signal 230, idler signal 318 has been added, representing corresponding one or more wavelengths of optical signal 310, but spectrally spaced symmetrically with respect to pump wavelength 314. Also, the optical power of the signals in spectra 230-S has been reduced, which is indicative of FWM to generate idler signal 318.

Figure 4:
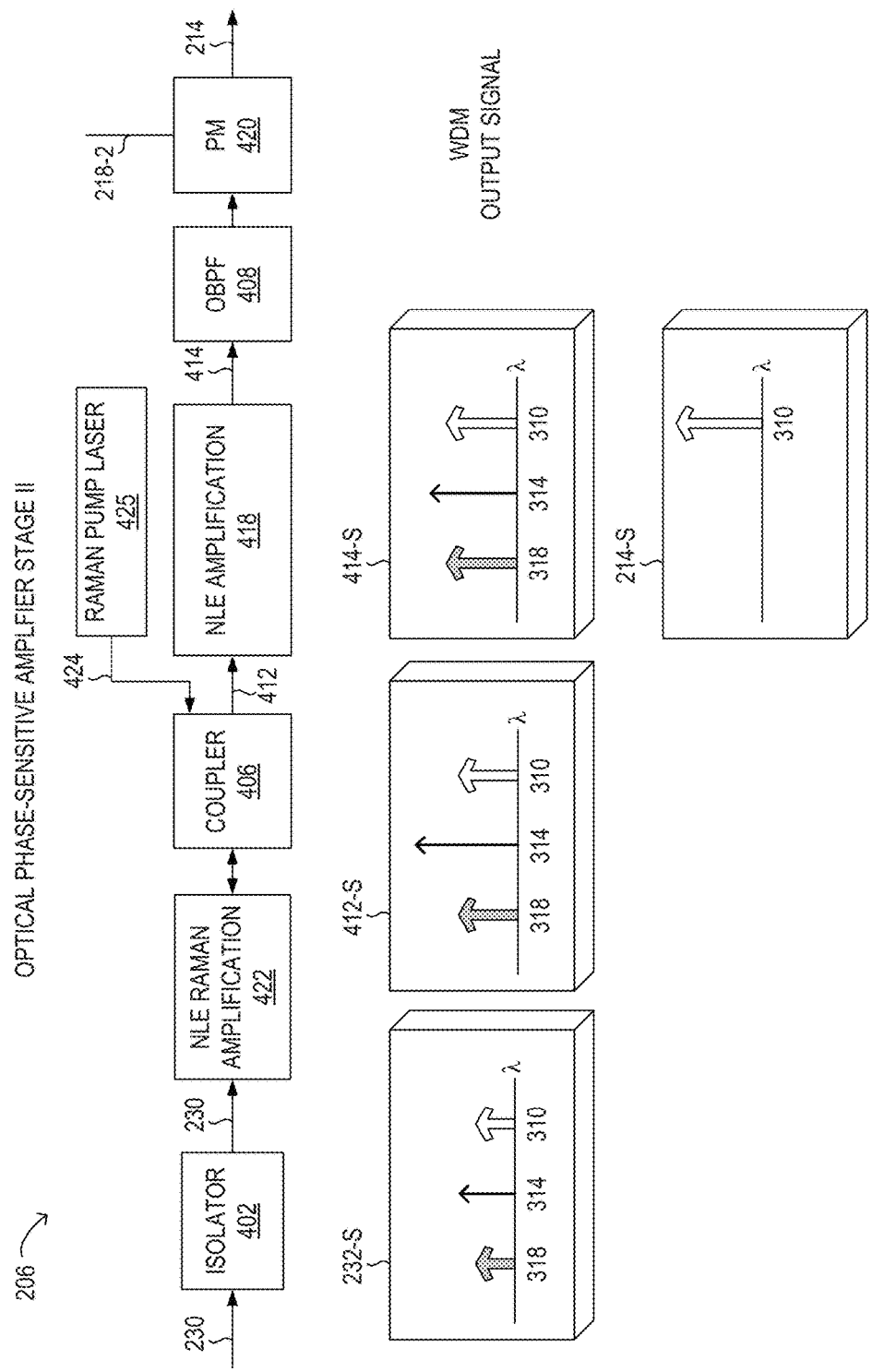
FIG. 4 is a block diagram of selected elements of an embodiment of a phase-sensitive optical amplifier stage II.

Referring now to FIG. 4, selected elements of an embodiment of an optical PSA stage II 206 are depicted. In FIG. 4, optical PSA stage II 206 is shown in a schematic representation and is not drawn to scale. It is noted that, in different embodiments, optical PSA stage II 206 may be operated with additional or fewer elements as shown in FIG. 4.

In FIG. 4, optical PSA stage II 206 receives PSA stage I optical signal 230 from optical PSA stage I 204. PSA stage I optical signal 230 may be passed through isolator 402 to prevent back propagation of a Raman pump wavelength 424, before sending PSA stage I optical signal 230 to NLE Raman amplification 422, which receives the Raman pump wavelength 424 from a Raman pump laser 425 using coupler 406 in a counter propagating direction. PSA stage I optical signal 230 may include optical signal 310, which comprises the wavelengths in input WDM optical signal 210, as described above, along with corresponding idler signals 318 and pump wavelength 314.

In optical PSA stage II 206, NLE Raman amplification 422 may comprise a Raman amplifier that includes Raman pump laser 425, which may be a laser source that is directed through an NLE as a gain medium in a counter propagation direction to the optical signal being processed (PSA stage I optical signal 230). Raman pump wavelength 424 from Raman pump laser 425 may be selected based on the gain medium used. For example, a 13 THz Raman pump frequency may be used with $GeO_2/SiO_2$ single mode fibers (SMF) as the NLE, while a 40 THz Raman pump frequency may be used with $P_2O_5$-doped $SiO_2$ phosphate-doped fiber (PDF) as the NLE in NLE Raman amplification 422. Furthermore, modulation or modification of the optical power of Raman pump laser 425 may be used to determine or modify an optical gain of NLE Raman amplification 422. It is noted that Raman amplification may be optional in some embodiments of optical PSA stage II 206, such that isolator 402, NLE Raman amplification 422, coupler 406, and Raman pump laser 425 may be omitted.

The output of NLE Raman amplification 422 is shown as Raman amplified optical signal 412, which is directed to NLE amplification 418, which is a non-linear optical element. In the presence of Raman amplified optical signal 412, one-pump four wave mixing (FWM) may occur at NLE amplification 418 to amplify the WDM optical signal and the idler signals, at the expense of the intensity of pump wavelength 314. NLE amplification 418 may include components for performing one-pump optical four-wave mixing (FWM). The one-pump FWM may be accomplished by passing the input signal, or filtered portions thereof, through a non-linear optical element (NLE), such as a doped optical fiber, periodically poled lithium niobate (PPLN), aluminium gallium arsenide (AlGaAs) or other semiconductor material that exhibits desired optical non-linearity.

After NLE amplification 418, optical signal 414 includes the amplified WDM optical signals and idler signals, along with the diminished intensity of pump wavelength 314. An optical bandpass filter (OBPF) 408 may then be applied to isolate WDM output signal 214. Then, a phase modulator 420 may be used to apply a second phase modulation to counter dither the phase modulation applied by phase modulator 320 (see FIG. 3). Furthermore, in some implementations, PM 420 may include, or may be augmented by, an intensity modulator that performs intensity modulation, because at least some intensity modulation may be transferred to optical signal 414 with the phase modulation of pump wavelength 314 performed by phase modulator 320. As shown, phase modulator 420 receives second phase control signal 218-2 from phase shifter 208, as described above. The phase modulation and intensity modulation that may be performed at PM 420 can be controlled using second phase control signal 218-2 as input.

Also shown in FIG. 4 are spectra of the different signals transmitted in optical PSA stage II 206. In spectra 232-S, optical signal 310 represents one or more wavelengths included in WDM output signal 214, while idler signals 318 are conjugates of optical signal 310 with respect to pump wavelength 314. In spectra 412-S, corresponding to Raman amplified optical signal 412, optical signal 310, pump wavelength 314, and idler signals 318 may be amplified (shown with increased signal intensity). In spectra 414-S, optical signal 310 and idler signals 318 may be amplified at the expense of pump wavelength 314, corresponding to FWM. In spectra 214-S, optical signal 310 is isolated in amplified form to generate WDM output signal 214.

Figure 5:
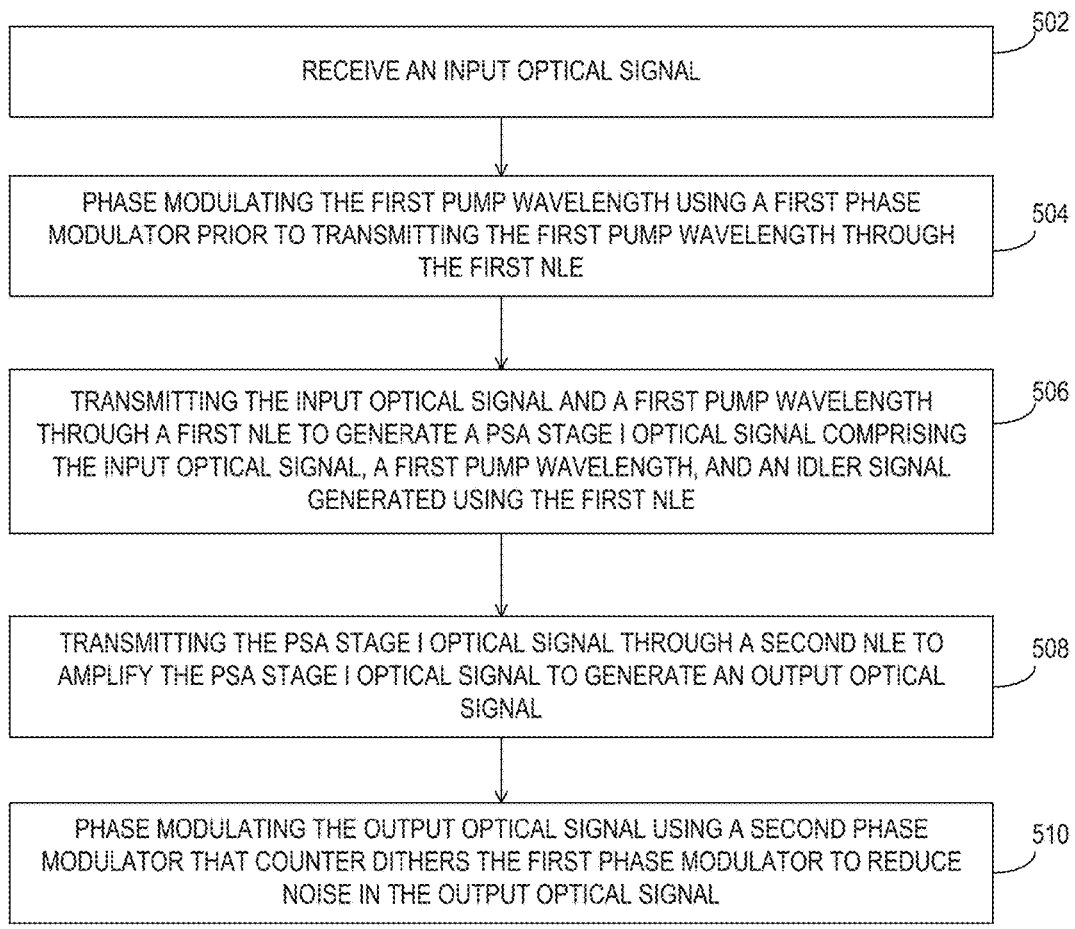
FIG. 5 is a method for operating phase-sensitive amplifiers in optical networks.

Referring now to FIG. 5, a flowchart of selected elements of an embodiment of a method 500 for operating phase-sensitive amplifiers in optical networks, as described herein, is depicted. In various embodiments, method 500 may be performed using PSA 200 in an optical network. It is noted that certain operations described in method 500 may be optional or may be rearranged in different embodiments.

Method 500 may begin at step 502 by receiving an input optical signal. At step 504, the first pump wavelength is phase modulated using a first phase modulator prior to transmitting the first pump wavelength through the first NLE. At step 506, the input optical signal and a first pump wavelength are transmitted through a first NLE to generate a PSA stage I optical signal comprising the input optical signal, a first pump wavelength, and an idler signal generated using the first NLE. At step 508, the PSA stage I optical signal is transmitted through a second NLE to amplify the PSA stage I optical signal to generate an output optical signal. At step 510, the output optical signal is phase modulated using a second phase modulator that counter dithers the first phase modulator to reduce noise in the output optical signal.

As disclosed herein, phase modulation of an output optical signal from a phase-sensitive amplifier may be used to perform phase adjustment for optimal phase-sensitive amplification. Specifically, when the optical pump is phase modulated to suppress SBS, a second phase modulator may be used to counter dither the first phase modulator. Both phase modulators may be controlled by a phase shifter. Intensity modulation of the output optical signal may also be performed to reduce noise. In this manner, the OSNR of the output optical signal may be increased.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An optical system for phase-sensitive amplification of optical signals, the optical system comprising:
    an input optical signal;
    a phase-sensitive amplifier (PSA) stage I receiving the input optical signal, further comprising:
        a pump laser generating a first pump wavelength;
        a first phase modulator for phase modulating the first pump wavelength; and
        a first non-linear optical element (NLE) through which the input optical signal and the first pump wavelength are transmitted to generate a PSA stage I optical signal comprising the input optical signal, the first pump wavelength, and an idler signal generated using the first NLE; and
    a PSA stage II receiving the PSA stage I optical signal, wherein the PSA stage II further comprises:
        a second NLE through which the PSA stage I optical signal is amplified to generate an output optical signal; and
        a second phase modulator for phase modulating the output optical signal, wherein the second phase modulator counter dithers the first phase modulator to reduce noise in the output optical signal.

2. The optical system of claim 1, wherein the PSA stage II further comprises:
    a Raman amplifier; and
    a second pump wavelength for transmission through the Raman amplifier in a counter propagating direction to the PSA stage I signal.

3. The optical system of claim 1, further comprising:
    a phase shifter to control the first phase modulator and the second phase modulator.

4. The optical system of claim 1, wherein the input optical signal comprises a wavelength division multiplexed (WDM) optical signal.

5. The optical system of claim 1, further comprising:
    an intensity modulator for intensity modulating the output optical signal, wherein the intensity modulator reduces intensity modulation in the output optical signal resulting from the phase modulation of the first pump wavelength.

6. A phase-sensitive amplifier, comprising:
    a phase-sensitive amplifier (PSA) stage I receiving an input optical signal, wherein the PSA stage I further comprises:
        a pump laser generating a first pump wavelength;
        a first phase modulator for phase modulating the first pump wavelength; and
        a first non-linear optical element (NLE) through which the input optical signal and the first pump wavelength are transmitted to generate a PSA stage I optical signal comprising the input optical signal, the first pump wavelength, and an idler signal generated using the first NLE; and
    a PSA stage II receiving the PSA stage I optical signal, wherein the PSA stage II further comprises:
        a second NLE through which the PSA stage I optical signal is amplified to generate an output optical signal; and
        a second phase modulator for phase modulating the output optical signal, wherein the second phase modulator counter dithers the first phase modulator to reduce noise in the output optical signal.

7. The phase-sensitive amplifier of claim 6, wherein the PSA stage II further comprises:
    a Raman amplifier; and
    a second pump wavelength for transmission through the Raman amplifier in a counter propagating direction to the PSA stage I signal.

8. The phase-sensitive amplifier of claim 6, further comprising:
    a phase shifter to control the first phase modulator and the second phase modulator.

9. The phase-sensitive amplifier of claim 6, wherein the input optical signal comprises a wavelength division multiplexed (WDM) optical signal.

10. The phase-sensitive amplifier of claim 6, further comprising:
    an intensity modulator for intensity modulating the output optical signal, wherein the intensity modulator reduces intensity modulation in the output optical signal resulting from the phase modulation of the first pump wavelength.

11. A method for operating phase-sensitive amplifiers in optical networks, the method comprising:
    receiving an input optical signal;
    sending the input optical signal to a phase-sensitive amplifier (PSA) stage I to generate an idler signal, further comprising:
        phase modulating a first pump wavelength using a first phase modulator; and
        transmitting the input optical signal and the first pump wavelength through a first non-linear optical element (NLE) to generate a PSA stage I optical signal comprising the input optical signal, the first pump wavelength, and the idler signal generated using the first NLE; and amplifying the PSA stage I optical signal using a PSA stage II, further comprising:

transmitting the PSA stage I optical signal through a second NLE to amplify the PSA stage I optical signal to generate an output optical signal; and phase modulating the output optical signal using a second phase modulator that counter dithers the first phase modulator to reduce noise in the output optical signal.

12. The method of claim 11, wherein amplifying the PSA stage I optical signal further comprises:

transmitting a second pump wavelength through a Raman amplifier in a counter propagating direction to the PSA stage I signal.

13. The method of claim 11, wherein phase modulating the first pump wavelength and phase modulating the output optical signal further comprises:

controlling the first phase modulator and the second phase modulator using a phase shifter.

14. The method of claim 11, wherein the input optical signal comprises a wavelength division multiplexed (WDM) optical signal.

15. The method of claim 11, wherein amplifying the PSA stage I optical signal further comprises:

intensity modulating the output optical signal, including reducing intensity modulation in the output optical signal resulting from the phase modulating of the first pump wavelength.

* * * * *